United States Patent
Karim et al.

(10) Patent No.: US 7,226,099 B2
(45) Date of Patent: Jun. 5, 2007

(54) LIFTING DEVICE AND PANELBOARD EMPLOYING THE SAME

(75) Inventors: Syed M. Karim, Lincoln, IL (US); Jeffrey L. Johnson, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 499 days.

(21) Appl. No.: 10/780,333

(22) Filed: Feb. 17, 2004

(65) Prior Publication Data

US 2005/0225932 A1 Oct. 13, 2005

(51) Int. Cl.
*B65G 7/12* (2006.01)

(52) U.S. Cl. .......................... 294/15; 294/92

(58) Field of Classification Search .................. 294/15, 294/27.1, 89, 92, 158; 16/422, 425
See application file for complete search history.

(56) References Cited

U.S. PATENT DOCUMENTS

| | | | | |
|---|---|---|---|---|
| 2,427,104 A | * | 9/1947 | Hosler | 294/15 |
| 2,511,995 A | | 8/1948 | Robertson et al. | |
| 2,613,978 A | * | 10/1952 | Marulli | 294/27.1 |
| 4,072,335 A | * | 2/1978 | Tift et al. | 294/93 |
| 4,162,517 A | | 7/1979 | Reed | |
| 4,964,664 A | * | 10/1990 | Crittenden | 294/15 |
| 5,685,397 A | * | 11/1997 | Maddox et al. | 188/36 |
| 6,415,475 B1 | * | 7/2002 | Dixon | 16/110.1 |

* cited by examiner

*Primary Examiner*—Dean J. Kramer
(74) *Attorney, Agent, or Firm*—Martin J. Moran (57) ABSTRACT

A lifting device ergonomically and safely lifts an object having an elongated aperture. The lifting device includes a lifting member having a first end with a handle portion for gripping by a user and a second end with an object-engaging portion for securely engaging the elongated aperture. A stabilizing member coupled to the lifting member adjacent the object-engaging portion is structured to stabilize the object while moving it. A panelboard employs one or more lifting devices which engage elongated apertures thereof.

5 Claims, 6 Drawing Sheets

LIFTING DEVICE AND PANELBOARD EMPLOYING THE SAME

BACKGROUND OF THE INVENTION

1. Field of the Invention

The present invention relates generally to panelboards and, more particularly, to a lifting device for lifting and facilitating the installation of panelboards. The invention also relates to a lifting device.

2. Background Information

Panelboard assemblies, including load centers, are power distribution devices used in residential, industrial and commercial applications.

Figure 1:
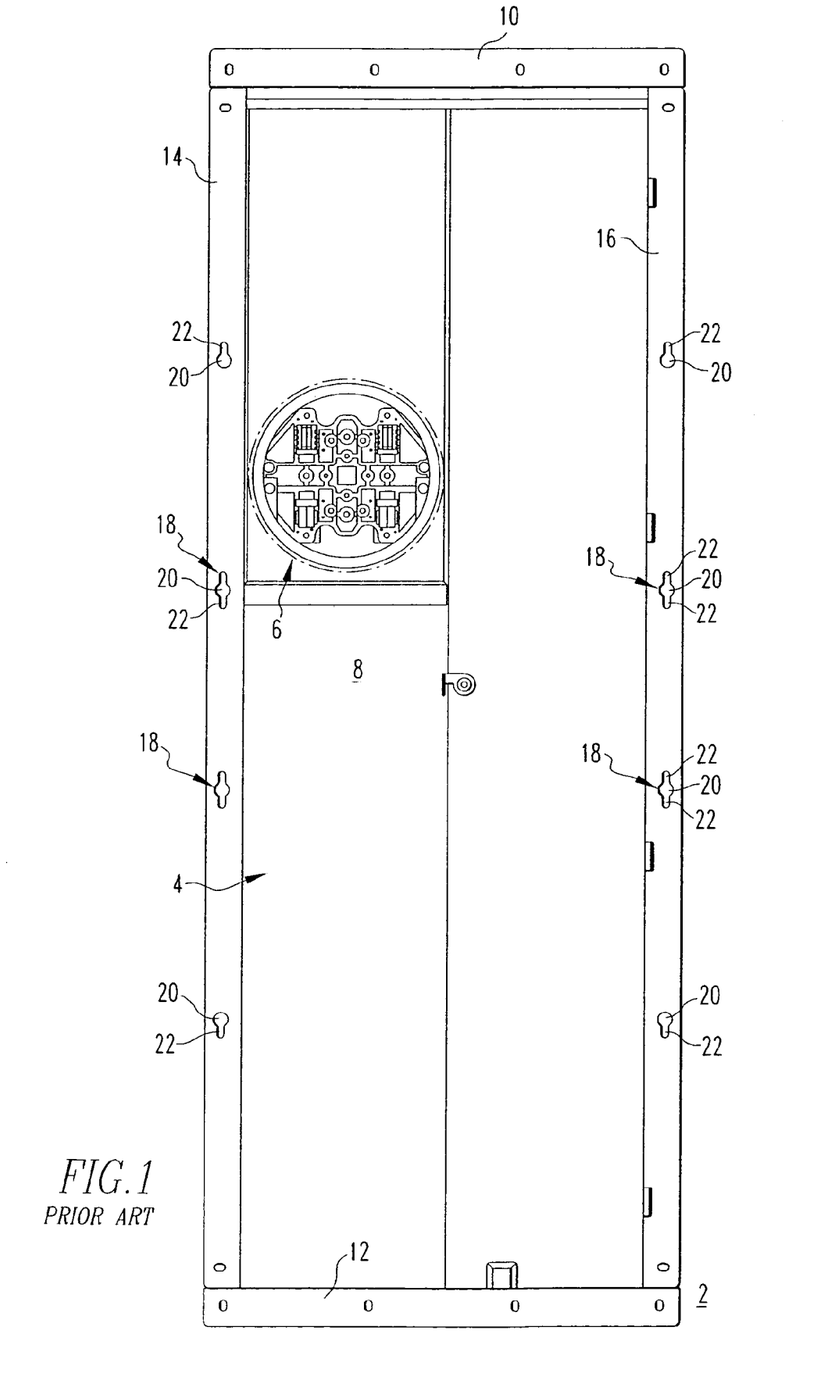
FIG. 1 is a vertical elevational view of a semi-flush metered panelboard.

Panelboards, such as the semi-flush metered panelboard 2 shown in FIG. 1, comprise a wall-mounted box enclosure 4 supporting electrical switching apparatus (e.g., without limitation, circuit switching devices and circuit interrupters such as circuit breakers, contactors, motor controllers and other load controllers) (not shown). A meter 6 on the front cover 8 of the enclosure 4 provides a visual readout of information indicative of electrical conditions related to the panelboard 2. The edges of the enclosure 4 typically have a number of flanges, such as top, bottom and two side flanges 10, 12, 14, 16, respectively, shown in FIG. 1. These flanges 10, 12, 14, 16 are typically fabricated from steel (e.g., without limitation, galvanized steel; painted steel). As shown, each of the side flanges 14, 16 include a keyhole-shaped aperture 18 (two keyhole-shaped apertures 18 are shown in each side flange 14, 16 in FIG. 1).

Panelboards can be heavy and awkward to handle during installation. Metered panelboards are required to have the meters installed at a specific height (e.g., approximately eye level), in order to facilitate observation thereof. A typical panelboard installation requires the installer to lift the device and set it into a prepared rough opening in, for example, the wall of a building. Without a lifting device, the person installing the panelboard is forced to grasp the side flanges of the panelboard, in order to grip the unit, set it in place and maintain it in the proper orientation as he or she initiates the installation. This process is not only ergonomically unfriendly, but may also be dangerous. For example, the panelboard flanges are typically metal and often remain relatively sharp after fabrication. The installer could be injured by the sharp edges of these flanges or by other sharp features of the panelboard, such as, for example, burs left behind when making the holes and slots of the panelboard flanges.

There is a need, therefore, to easily, safely and economically engage and lift panelboards for moving and installation thereof.

SUMMARY OF THE INVENTION

These needs and others are satisfied by the present invention, which is directed to a lifting device that temporarily engages an elongated aperture in an object, for example an elongated aperture in the side flange of a panelboard, in order to safely and ergonomically lift the panelboard and facilitate installation thereof.

As one aspect of the invention, a lifting device for moving an object having an elongated aperture comprises: a lifting member including a first end and a second end, the first end of the lifting member having a handle portion for gripping by a user, the second end of the lifting member having an object-engaging portion structured for insertion into the elongated aperture, in order to securely engage the object; and a stabilizing member coupled to the lifting member adjacent the object-engaging portion and structured to stabilize the object while moving it.

The lifting member may include a rod having a bend between the first and second ends thereof.

The elongated aperture may be a keyhole-shaped aperture having a generally circular portion and at least one slot portion extending therefrom. The object-engaging portion of the rod may include a chamfer and a circumferential groove between the chamfer and the generally rectangular member plate, with the chamfer being structured for insertion into the generally circular portion of the keyhole-shaped aperture, in order that the circumferential groove may slide and lock within one of the at least one narrower slot portion of the aperture, thereby securely engaging the object.

The object may be a panelboard including a side flange having the elongated aperture. The second end of the lifting member may include an axial bore formed therein, the stabilizing member may be a U-shaped member structured to receive the side flange of the panelboard, and the object-engaging portion of the lifting member may further include a spring-loaded assembly comprising: a spring disposed within the axial bore; a plunger disposed within the axial bore adjacent the spring; and an actuating lever coupled to the plunger and structured to depress the plunger and the spring when actuated by a user, in order to permit insertion of the side flange into the U-shaped member and alignment between the elongated aperture therein and the plunger, the plunger structured to extend through the aligned aperture when the actuating lever is released.

As another aspect of the invention, a panelboard comprises: an enclosure including a side flange having an elongated aperture therein; and at least one lifting device comprising: a lifting member including a first end and a second end, the first end of the lifting member having a handle portion for gripping by a user, the second end having an engaging portion inserted into the elongated aperture, in order to securely engage the side flange; and a stabilizing member coupled to the lifting member adjacent the engaging portion and engaging the side flange.

The panelboard may include first and second side flanges and the at least one lifting device may include first and second lifting devices wherein the first lifting device engages the elongated aperture in the first side flange and the second lifting device engages the second side flange, in order to further facilitate movement of the panelboard by a user.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For purposes of illustration, the invention will be described as applied to semi-flush, metered panelboards, although it will become apparent that it could also be applied to other types of panelboards (e.g., without limitation, non-metered panelboards; non-flush panelboards; load centers) and power distribution equipment, as well as to other objects including a keyhole-shaped slot.

As employed herein, the term "semi-flush" refers to the configuration and structure of a panelboard, which is designed for installation within a prepared opening in, for example, the wall of a building, resulting in the front of the installed panelboard being substantially flush with the surface of the wall.

Figure 2:
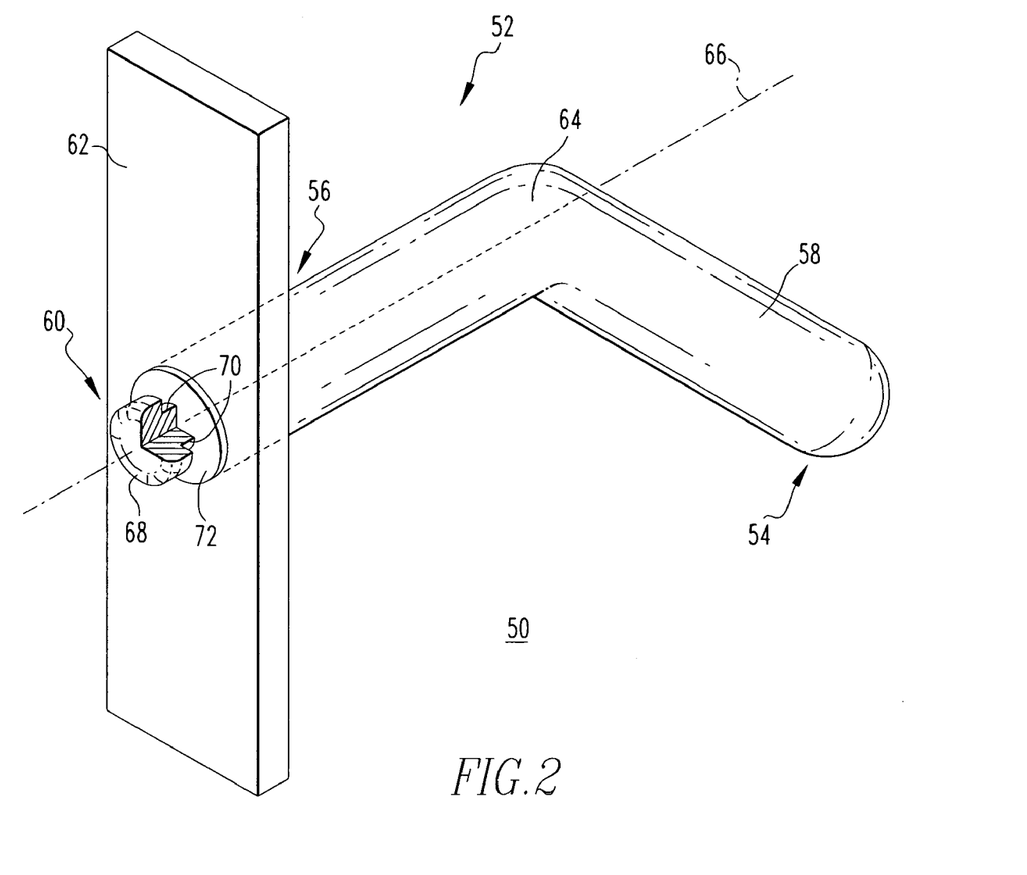
FIG. 2 is an isometric view of a lifting device, in accordance with the present invention.

FIG. 2 illustrates a lifting device 50 for moving an object having an elongated aperture 18, such as the exemplary semi-flush metered panelboard 2 shown in FIG. 1. As shown, the exemplary semi-flush metered panelboard 2 includes a number of elongated apertures, such as the exemplary keyhole-shaped apertures 18 in the first and second side flanges 14, 16 of the panelboard 2. As shown in FIG. 1, the exemplary keyhole-shaped apertures 18 include a generally circular portion 20 and at least one slot portion 22 extending therefrom (the first and second side flanges 14, 16 of FIG. 1 include two types of keyhole-shaped apertures, one type having a single slot portion 22 extending from the generally circular portion 20 and the other having two slot portions 22 extending from the generally circular portion 20).

Referring to FIG. 2, the lifting device 50 includes a lifting member 52 having a first end 54 and a second end 56. The first end 54 includes a handle portion 58 for gripping by a user. The second end 56 includes an object-engaging portion 60 structured for insertion into the keyhole-shaped aperture 18 (FIG. 1), in order to securely engage the side flange 14, 16 (FIG. 1) of the panelboard 2 (FIG. 1). The lifting device 50 further includes a stabilizing member 62 coupled to the lifting member 52 adjacent the object-engaging portion 60 and structured to stabilize the panelboard 2 (best shown in FIG. 3) while moving it. As shown, the exemplary stabilizing member is a generally rectangular plate 62 and the exemplary lifting member is a rod 52 having a bend 64 between the first and second ends 54, 56 thereof. The exemplary bend 64 forms an angle of about 45 degrees with respect to the longitudinal axis 66 of the rod 52, thereby providing the handle portion 58 with an ergonomic gripping position for the user.

The exemplary generally rectangular stabilizing plate 62 and rod 52 are preferably made from steel, with the plate 62 being welded to the rod 52 adjacent the engaging portion 60 thereof and extending substantially perpendicularly therefrom. However, it will be appreciated that the stabilizing member 62 and handle portion 58 of the lifting member 52 could alternatively be made from any suitable material other than steel. It will also be appreciated that the stabilizing member could have an alternative configuration to the exemplary generally rectangular stabilizing plate 62 and that it could be coupled to the lifting member 52 by any number of suitable fastening mechanisms other than the exemplary weld.

As shown in FIG. 2, the exemplary object-engaging portion 60 of the rod 52 includes a chamfer 68 and a circumferential groove 70 between the chamfer 68 and the stabilizing plate 62. The chamfer 68 is structured for insertion into the generally circular portion 20 (FIG. 1) of the keyhole-shaped aperture 18 (FIG. 1), in order that the circumferential groove 70 may slide and lock within one of the at least one slot portion 22 (FIG. 1) of the aperture 18 (FIG. 1), thereby securely engaging the panelboard 2 (best shown in FIG. 3).

Figure 3:
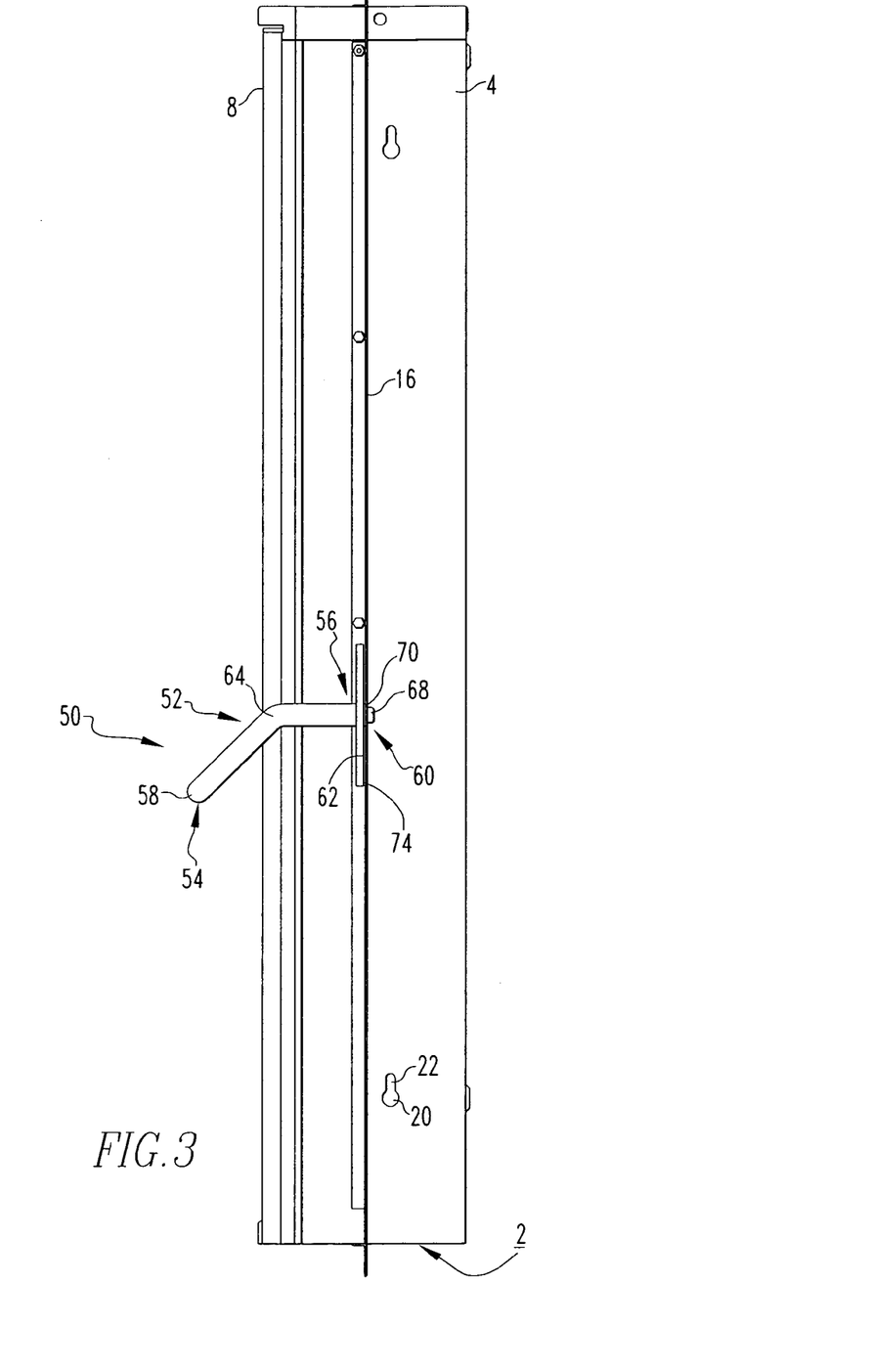
FIG. 3 is an end elevational view of the panelboard of FIG. 1 engaged by the lifting device of FIG. 2.

FIG. 3 illustrates the exemplary lifting device 50 as employed to engage and move the semi-flush metered panelboard 2. As employed, a user grips the handle portion 58 of the lifting device 50 and inserts the chamfer 68 of the engaging portion 60 into the generally circular portion 20 of one of the keyhole-shaped apertures 18 (best shown in FIG. 1) on one of the side flanges 14, 16 of the panelboard enclosure 4 (the lifting device 50 is shown engaging a keyhole-shaped aperture 18 in the second side flange 16 in FIG. 3). The user then manipulates the lifting device 50 so that the circumferential groove 70 slides and locks within one of the at least one slot portions 22 (best shown in FIG. 1) of the keyhole-shaped aperture 18 (FIG. 1), in order to securely engage the side flange 16. In this manner, the user may safely lift and move the panelboard without having to directly grab any of the panelboard flanges 10, 12, 14, 16 (best shown in FIG. 1) and thereby eliminating the possibility of being cut by the sharp edges thereof.

Continuing to refer to FIG. 3, the stabilizing member 62 further facilitates lifting and moving of the panelboard 2 by preventing excessive rotation of the panelboard 2 with respect to the lifting device 50. For example, as shown in FIG. 3, the exemplary generally rectangular plate stabilizing member 62 extends substantially perpendicular from the second end 56 of the rod 52 and substantially parallel to the panelboard side flange, for example 16. Accordingly, if the panelboard 2 begins to rotate with respect to the circumferential groove 70 in the object-engaging portion 60 of the lifting device 50, the generally rectangular plate 62 will engage the side flange 16 proximate the keyhole-shaped aperture 18 (FIG. 1) in which the lifting device 50 is disposed, thus resisting such rotation and stabilizing the panelboard 2.

The exemplary object-engaging portion 60 of the lifting device 50 includes an optional, narrow extension 72 (best shown in FIG. 2) of the rod 52 between the circumferential groove 70 and the generally rectangular stabilizing plate 62. The narrow extension 72 provides a narrow gap 74 (best shown in FIG. 3) between the generally rectangular stabilizing plate 62 and the panelboard side flange 16, when the lifting device 50 is engaged. The narrow gap 74 accommodates dimensional variations, such as fabricating defects in the panelboad side flange 16, thus ensuring that the circumferential groove 70 may effectively slide within the slot portion 22 (FIG. 1) of the keyhole-shaped aperture 18 (FIG. 1) and lock therein without the generally rectangular stabilizing plate 62 preventing such engagement. For example, without the extension 72 and the narrow gap 74 formed thereby, the stabilizing plate 62 might bind with, for example, a deformity in the side flange 16 or it might prevent the full insertion of the lifting device chamfer 68 into the generally circular portion 20 of the keyhole-shaped aperture 18 (FIG. 1).

Figure 4:
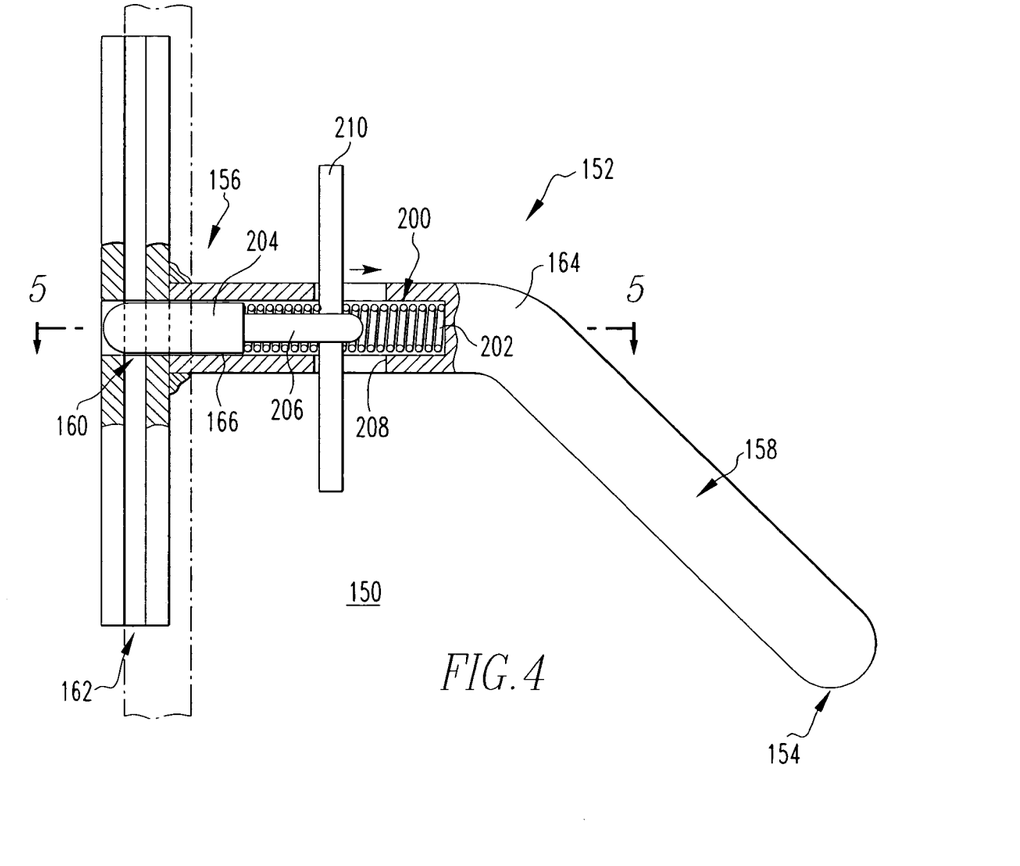
FIG. 4 is an end elevational view of a lifting device in accordance with another embodiment of the present invention with a portion of the lifting member cut-away to show internal structures.
Figure 5:
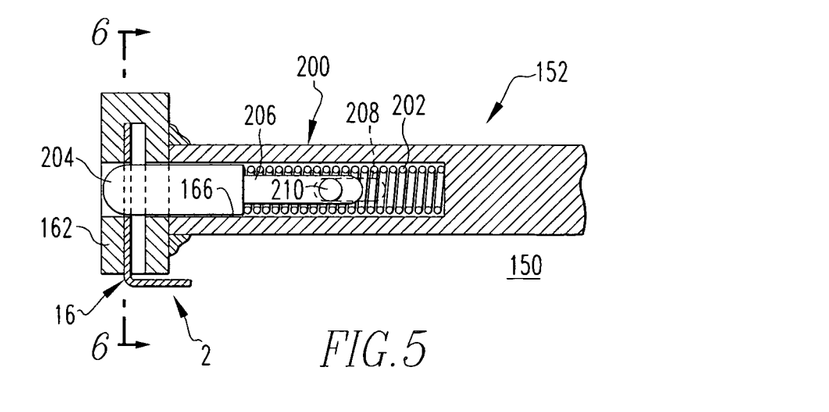
FIG. 5 is a cross-sectional view taken along line 5—5 of FIG. 4 and showing the lifting device of FIG. 4 engaging a portion of the panelboard of FIG. 1, which is shown in phantom line drawing.
Figure 6:
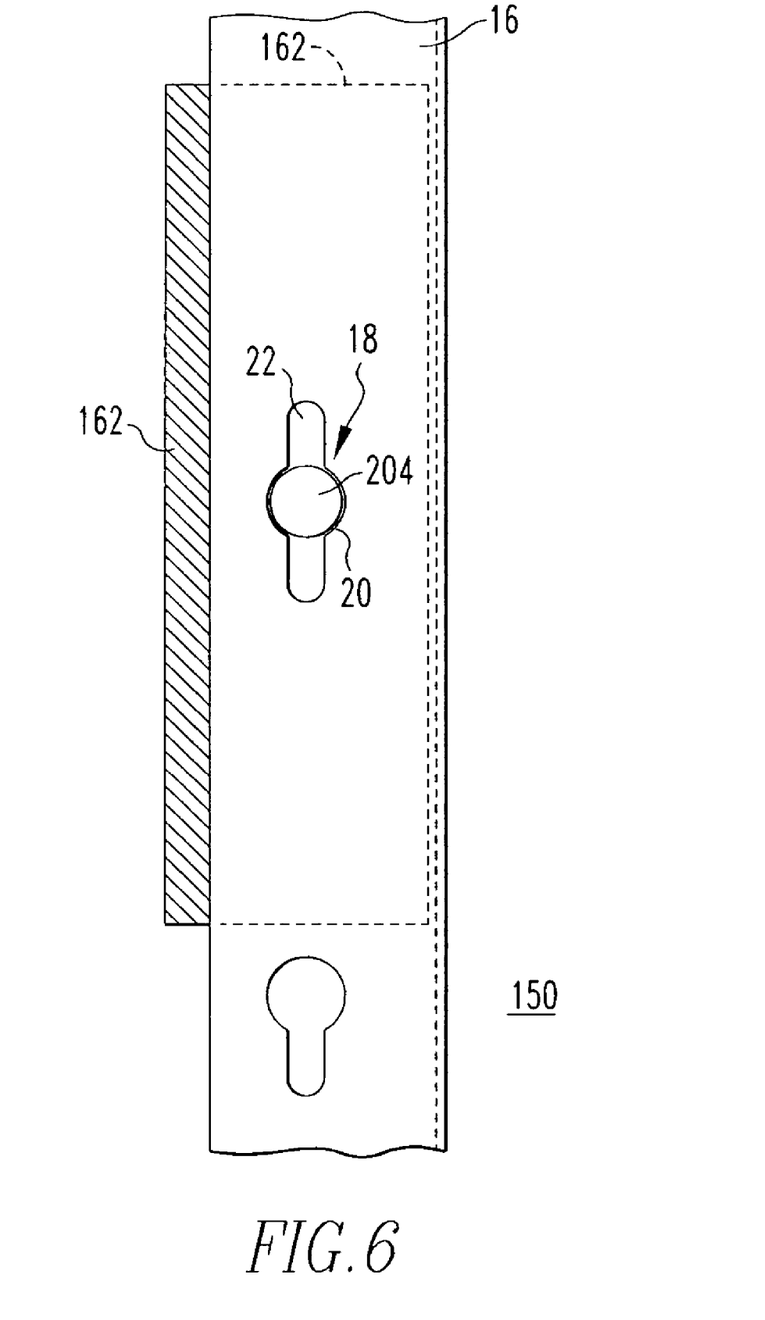
FIG. 6 is a cross-sectional view taken along line 6—6 of FIG. 5.

FIGS. 4–6 illustrate an example alternative embodiment of the lifting device 50 of FIGS. 2 and 3. This lifting device 150 employs a spring-loaded assembly 200 rather than the chamfer 68 and circumferential groove 70, in order to engage the keyhole-shaped aperture 18 of the panelboard 2 (FIG. 6).

As best shown in FIG. 4, the lifting device 150 includes a lifting member 152 having a first end 154, a second end 156 and a bend 164 therebetween. The second end 156 includes an axial bore 166 formed therein. The stabilizing member is a U-shaped member 162 structured to receive the side flange 16 (FIG. 5) of the panelboard 2 (FIG. 5). The engaging portion 160 of the lifting member 152 further includes a spring-loaded assembly 200 including a spring, such as the exemplary coil spring 202 shown, which is disposed within the axial bore 166. A plunger 204 is disposed within the axial bore 166 adjacent the coil spring 202 and an actuating lever 210 is coupled to the plunger 204. The actuating lever 210 is structured to depress the plunger 204 and the coil spring 202 when actuated by a user, in order to permit insertion of the side flange 16 into the U-shaped stabilizing member 162 and alignment between the keyhole-shaped aperture 18 (FIG. 6) therein and the plunger 204. When the actuating lever 210 is released, the plunger 204 extends through the aligned aperture 18, thereby securing and stabilizing the side flange 16 (best shown in FIGS. 5 and 6).

The second end 156 of the lifting member 152 includes a slot 208 extending through the lifting member 152 and the axial bore 166 therein. The plunger 204 includes a neck region 206 which is inserted within the coils of the coil spring 202. The actuating lever 210 extends through the slot 208 and couples to the neck region 206 of the plunger 204 (best shown in FIG. 4). In operation, the actuating lever 210 is actuated by pulling backwards thereon, thereby drawing the plunger 204 backwards, compressing the coil spring 202 and permitting insertion of the panelboard side flange 16 into the U-shaped stabilizing member 162, as shown in FIG. 5.

FIG. 6 shows the plunger 204 which, as discussed above, extends through the generally circular portion 20 of the keyhole-shaped aperture 18 when the actuating lever 210 is released. In this manner, the lifting device 150 engages and secures the panelboard side flange, for example 16, within the U-shaped stabilizing member 162, and permits the user to safely and efficiently lift and move the panelboard 2 without having to directly grab one of the flanges 10, 12, 14, 16 (FIG. 1) thereof. Accordingly, the user avoids the possibility of being cut by the sharp edges of the flanges.

Figure 7:
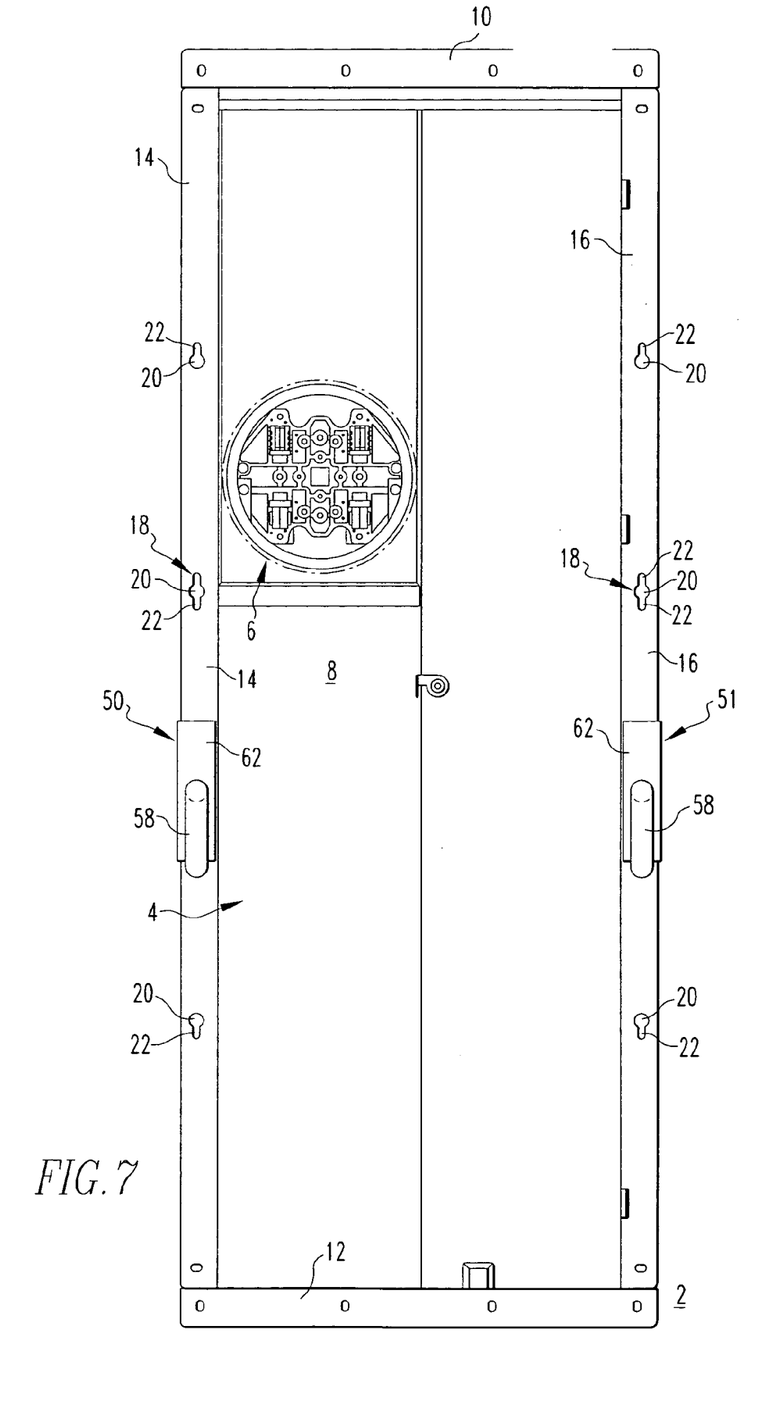
FIG. 7 is a vertical elevational view of the panelboard of FIG. 1 engaged by a pair of lifting devices, such as the lifting device of FIG. 2.

FIG. 7 illustrates a semi-flush metered panelboard 2 engaged by a pair of first and second lifting devices 50, 51 each engaging a keyhole-shaped aperture 18 in the first and second side flanges 14, 16, respectively, in order to permit the user to safely and ergonomically lift the panelboard 2. As shown, the lifting devices 50, 51 are employed parallel to one another to further facilitate lifting and moving the panelboard 2. However, it will be appreciated that any number of one or more lifting devices, for example 50, 51, 150 (FIG. 4) could be employed in any suitable configuration (not shown) on the panelboard 2 other than the configuration shown in FIG. 7. It will also be appreciated that the lifting device may be employed to engage any suitable elongated aperture on the panelboard 2, including such apertures which are disposed at locations other than on the first and second side flanges 14, 16. For example, the lifting device could be used to engage an elongated aperture disposed on the side of the panelboard enclosure 4 (see e.g., the elongated aperture near the bottom or the side of the panelboard enclosure in FIG. 3) or an elongated aperture disposed within the panelboard enclosure 4 (not shown).

Accordingly, the present invention provides a simple, inexpensive and ergonomic lifting device to quickly and safely facilitate the lifting, moving and installation of objects having an elongated aperture, such as, for example, semi-flush metered panelboards 2.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended in any and all equivalents thereof.

What is claimed is:

1. A lifting device for moving an object having an elongated aperture, said lifting device comprising:

a lifting member including a first end and a second end, the first end of said lifting member having a handle portion for gripping by a user, the second end of said lifting member having an object-engaging portion structured for insertion into said elongated aperture, in order to securely engage said object;

a stabilizing member coupled to said lifting member adjacent said object-engaging portion and structured to stabilize said object while moving it;

wherein said lifting member is a rod having a bend between the first and second ends thereof;

wherein said stabilizing member includes a plate coupled to said rod adjacent said object-engaging portion thereof, and extending substantially perpendicular therefrom; and wherein said elongated aperture is a keyhole-shaped aperture including a generally circular portion and at least one slot portion extending therefrom; wherein said object-engaging portion of said rod includes a chamfer and a circumferential groove between said chamfer and said plate; and wherein said chamfer is structured for insertion into said generally circular portion of said keyhole-shaped aperture, in order that said circumferential groove may slide and lock within one of said at least one slot portion of said aperture, thereby securely engaging said object.

2. The lifting device of claim 1, wherein said rod is a steel rod; and wherein said plate is a generally rectangular steel plate welded to said steel rod adjacent said object-engaging portion thereof.

3. A panelboard comprising:

an enclosure including a side flange having an elongated aperture therein; and at least one lifting device comprising:

a lifting member including a first end and a second end, the first end of said lifting member having a handle portion for gripping by a user, the second end having an engaging portion inserted into said elongated aperture, in order to securely engage said side flange;

a stabilizing member coupled to said lifting member adjacent said engaging portion and engaging said side flange;

werein said lifting member is a rod having a bend between the first and second ends thereof;

wherein said elongated aperture is a keyhole-shaped aperture including a generally circular portion and at least one slot portion extending therefrom; and wherein said engaging portion includes a chamfer on the second end of said rod and a circumferential groove between said chamfer and said stabilizing member; wherein said chamfer is inserted into said generally circular portion of said keyhole-shaped aperture in said side flange; and wherein said circumferential groove slides and locks within one of said at least one slot portion of said keyhole-shaped aperture, thereby securely engaging said side flange.

4. The panelboard of claim 3, wherein said stabilizing member includes a plate coupled to said rod adjacent said engaging portion thereof and extending substantially perpendicularly therefrom.

5. The panelboard of claim 4, wherein said rod is a steel rod; and wherein said plate is a generally rectangular steel plate welded to said steel rod adjacent said engaging portion thereof.

* * * * *